(12) United States Patent
Pasma et al.

(10) Patent No.: US 10,629,943 B2
(45) Date of Patent: Apr. 21, 2020

(54) BATTERY CAN

(71) Applicant: Apple Inc., Cupertino, CA (US)

(72) Inventors: Christopher R. Pasma, Cupertino, CA (US); Siddharth Mohapatra, Santa Clara, CA (US); George V. Anastas, San Carlos, CA (US); Bookeun Oh, Freemont, CA (US); YooEup Hyung, Cupertino, CA (US); Brian K. Shiu, Sunnyvale, CA (US); Haran Balaram, Cupertino, CA (US); Junhua Liu, Hayward, CA (US)

(73) Assignee: Apple Inc.

( * ) Notice: Subject to any disclaimer, the term of this patent is extended or adjusted under 35 U.S.C. 154(b) by 586 days.

(21) Appl. No.: 15/088,967

(22) Filed: Apr. 1, 2016

(65) Prior Publication Data
US 2016/0293995 A1    Oct. 6, 2016

Related U.S. Application Data

(60) Provisional application No. 62/142,930, filed on Apr. 3, 2015.

(51) Int. Cl.
*H01M 10/04*    (2006.01)
*H01M 2/04*    (2006.01)
(Continued)

(52) U.S. Cl.
CPC ..... *H01M 10/0468* (2013.01); *H01M 2/0202* (2013.01); *H01M 2/0207* (2013.01);
(Continued)

(58) Field of Classification Search
CPC ......... H01M 10/0436; H01M 10/0468; H01M 2220/30; H01M 2/0202; H01M 2/0207;
(Continued)

(56) References Cited

U.S. PATENT DOCUMENTS 6,326,103 B1 * 12/2001 Ido ..................... H01M 2/024
429/148
2008/0000882 A1 * 1/2008 VanDerlick ............ A61N 1/375
219/121.64
(Continued)

FOREIGN PATENT DOCUMENTS

| GB | 2005063 | 4/1979 |
|---|---|---|
| JP | 2014-035867 | 2/2014 |
| WO | WO 99/45602 | 9/1999 |

*Primary Examiner* — Daniel S Gatewood
(74) *Attorney, Agent, or Firm* — Polsinelli PC

(57) ABSTRACT

Aspects of the present disclosure involve various battery can designs. In general, the battery can design includes two fitted surfaces oriented opposite each other and seam welded together to form an enclosure in which a battery stack is located. To form the enclosure, the two fitted surfaces are welded together along the large perimeter. Other swelling-resisting advantages may also be achieved utilizing the battery can design described herein including, but not limited to, the ability to modify one or more can wall thicknesses to control a pressure applied to the battery stack by the can, overall reduction in wall thickness of the can through the use of stronger materials for the can surfaces, additional supports structures included within the can design, and/or bossing or other localized thinning of surfaces of the can.

18 Claims, 14 Drawing Sheets

(51) Int. Cl.
*H01M 2/02* (2006.01)
*H01M 2/10* (2006.01)
*H01M 2/06* (2006.01)
*H01M 2/36* (2006.01)

(52) U.S. Cl.
CPC ....... *H01M 2/0426* (2013.01); *H01M 2/0469* (2013.01); *H01M 2/1094* (2013.01); *H01M 10/0436* (2013.01); *H01M 2/06* (2013.01); *H01M 2/361* (2013.01); *H01M 2220/30* (2013.01)

(58) Field of Classification Search
CPC .... H01M 2/0426; H01M 2/0469; H01M 2/06; H01M 2/1094; H01M 2/361
See application file for complete search history.

(56) References Cited

U.S. PATENT DOCUMENTS

2012/0214051 A1* 8/2012 Tsukuda .............. H01M 2/0257 429/179
2012/0301759 A1* 11/2012 Yoshitake ........... H01M 2/0237 429/94
2018/0123095 A9* 5/2018 Fister .................. H01M 2/1077

* cited by examiner

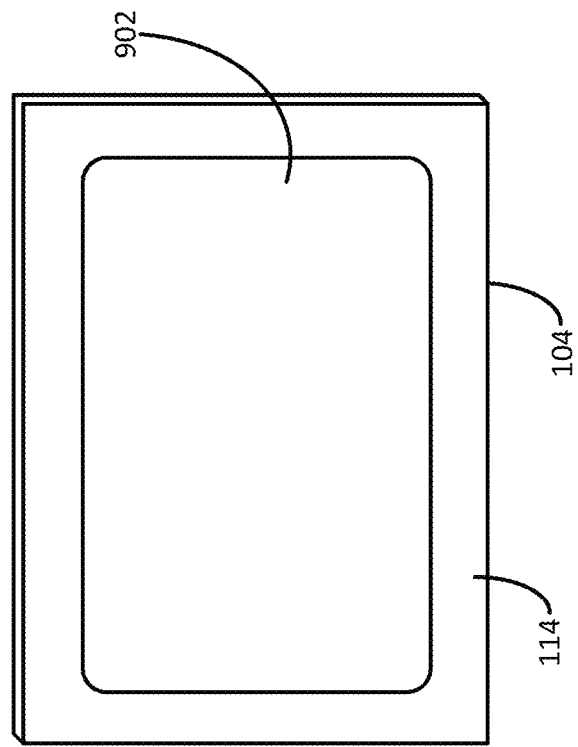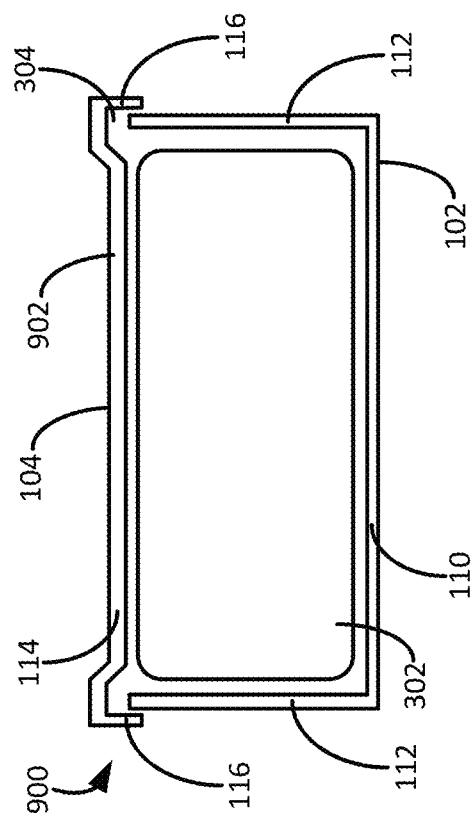
FIG. 9A
FIG. 9B

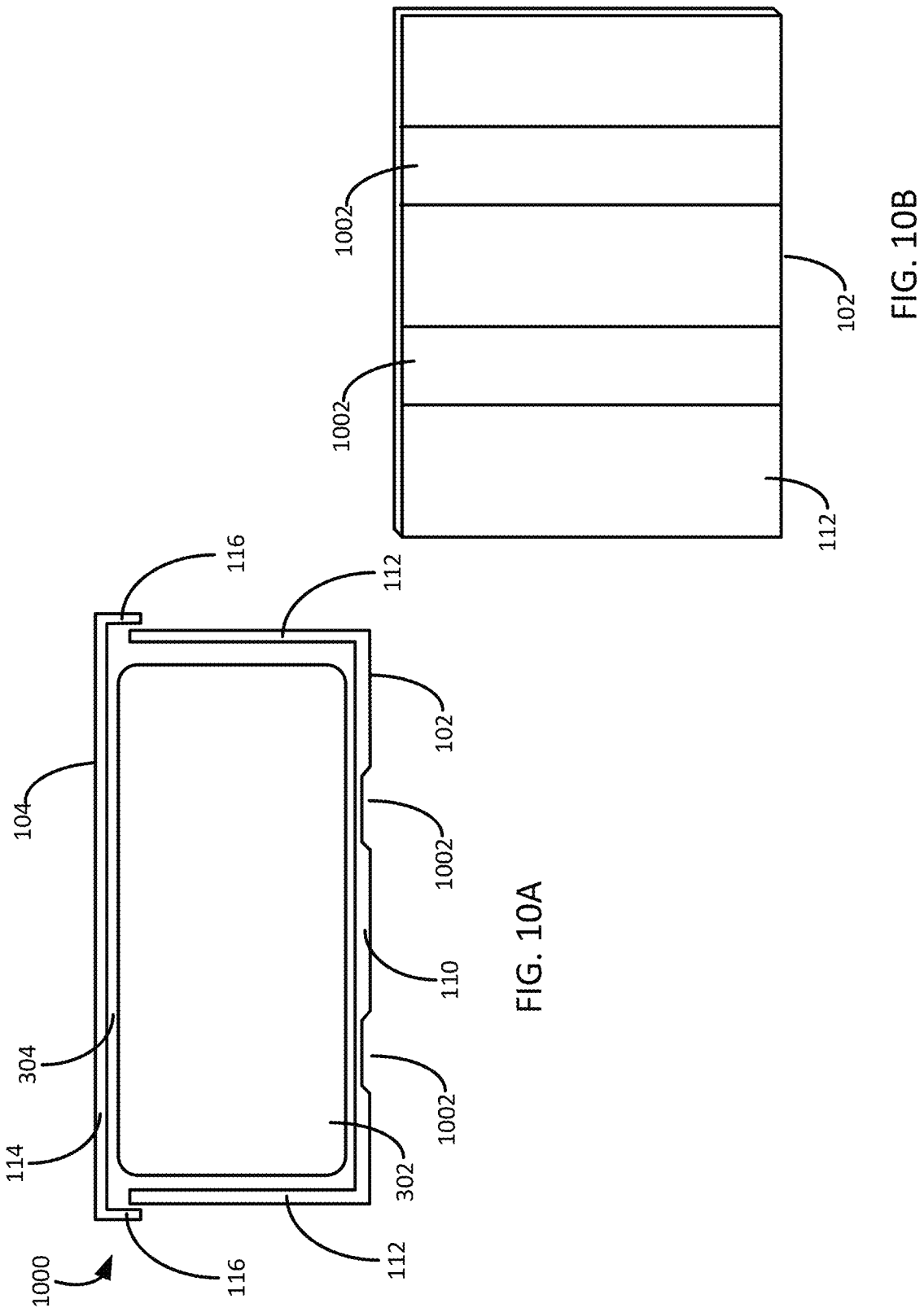

BATTERY CAN

RELATED APPLICATIONS

This application claims priority under 35 U.S.C. § 119(e) to U.S. Provisional Application No. 62/142,930 entitled "BATTERY CAN", filed on Apr. 3, 2015 which is incorporated by reference in its entirety herein.

TECHNICAL FIELD

This disclosure relates generally to battery systems, and more specifically to battery cans.

BACKGROUND

Battery performance and lifecycles in mobile electronic and other types of computing devices are an ever increasing concern. Particularly as mobile devices become smaller while the processing power and demands on such devices increase, the ability of the battery to provide the necessary power needs to the device increases in importance and competes with the desire to reduce the overall size of the device. Obtaining more power from the battery while restraining the overall size of the battery to fit within the mobile device is a continual challenge. It is with these and other issues in mind that various aspects of the present disclosure were developed.

SUMMARY

In one aspect, the disclosure is directed to a battery can that provides increased pressure on the battery stack for higher battery performance. In general, the battery can design can include two fitted surfaces oriented opposite each other, and welded together to form an enclosure in which a battery stack is located. In various aspects, the fitted surfaces can have an overlapping conformation. The two fitted surfaces can be welded together along the perimeter. The battery can may have any shape or size, giving the battery assembly substantial form factor flexibility.

In a further aspect, the disclosure is directed to a battery can assembly that includes a first portion having a first surface and one or more first walls extending from the first surface, and a second portion having a second surface and one or more second walls extending from the second surface. The length and width of the first surface can be larger than the length and width of each of the one or more first walls. A battery stack is disposed between the first and second portions.

In a further aspect, the disclosure is directed to a battery cell including a battery enclosure and a battery stack. The battery enclosure includes a bottom surface, a top surface, and at least one wall connecting the bottom surface to the top surface. The battery enclosure encloses the battery stack. At least one pressure feature is configured to apply a pressure force to the battery stack within the battery enclosure.

BRIEF DESCRIPTION OF THE DRAWINGS

Although the following figures and description illustrate specific embodiments and examples, the skilled artisan will appreciate that various changes and modifications may be made without departing from the spirit and scope of the disclosure.

FIGS. 9A and 9B are a cross-section view and top view of a battery can illustrating a first bossing feature on the top surface of the battery can.

FIGS. 10A and 10B are a cross-section view and bottom view of a battery can illustrating a localized thinning feature on the top surface of the battery can.

DETAILED DESCRIPTION

Figure 1:
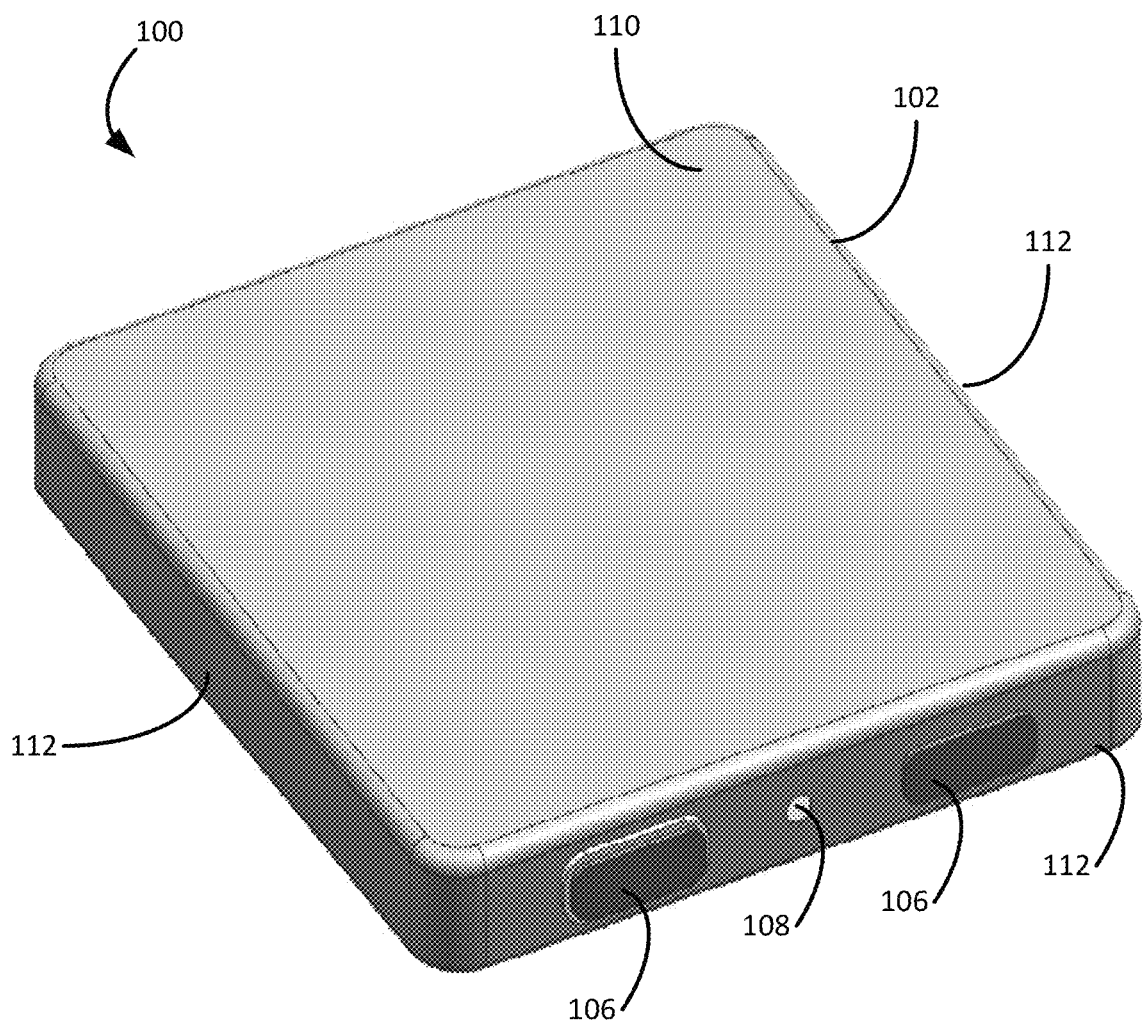
FIG. 1 is a first isometric view of a battery can using two dish or clamshell shaped outer surfaces.

As noted above, aspects of the present disclosure involve a battery can design that provides increased pressure on the battery stack for higher battery performance. In general, the battery can design can include two fitted surfaces oriented opposite each other, and welded together to form an enclosure in which a battery stack is located. In various aspects, the fitted surfaces can have an overlapping conformation. To form the enclosure, the two fitted surfaces can be welded together along the perimeter, referred to herein as the X-Y perimeter of the battery package or "can". The battery can and battery assembly can be used in conjunction with any battery variation, including any lithium ion battery variation In various aspects, battery can may have any shape or size, giving the battery assembly substantial form factor flexibility. For example, the battery can may be formed to fit within a prescribed area within a device, such as a computing device. This form may include any number of sides, angles, and/or shapes to account for one or more other components within the computing device casing. However, any shape or size of the battery cell is contemplated. Also, in various battery can embodiments described herein add more energy to the battery can than previous variations of lithium ion battery cells. This added energy may increase the performance of the battery over the lifetime of the battery cell.

Through this particular battery can design, several advantages may be obtained over conventional battery designs. For example, the battery can enclosure formed from the fitted surfaces may reduce the gap (i.e. a clearance or tolerance) between the battery stack and the can surface over conventional prismatic battery designs. The reduced gap can result in a more intimate and/or constant contact between battery and the battery can. This reduction in the gap aids in resisting swelling of the battery stack during the lifetime of the battery. Such resistance to the swelling of the battery stack may increase the performance, durability, and useful life of the battery, as well as protect the device in which the battery can is mounted. Other advantages of swelling-resistance may also be achieved utilizing the battery can design described herein including, but not limited to, the ability to modify one or more wall thicknesses of the battery can to increase pressure applied to the battery stack by the can, overall reduction in wall thickness of the can through the use of stronger materials for the can surfaces, additional support structures included within the can design, and/or bossing or other localized thinning of surfaces of the can. Because the battery can design herein includes two fitted surfaces welded together along the large X-Y perimeter rather than a cup shape with a lid welded along a small X-Z end of previous battery can designs, several design additions become available to strengthen the can and improve the overall performance and lifetime of the battery.

Additional features of the battery can design may also be considered and/or included to improve the performance of the battery can in response to the fitted can design. For example, the can design may include a welding shield adjacent to or near the welding seam between the two surfaces of the battery can. Such a welding shield may protect the battery stack from damage during the conjoining procedure of the two surfaces of the can design. Other features include improved electrolyte fill hole design to account for thinner wall thicknesses in the battery can due to one or more of the improvements noted above. Such fill hole designs may be included with one or more feedthrough structures contained in one edge of one of the fitted surfaces that provide electrical connections to the battery stack within the can. Additional features of the can designs are further discussed herein that further improve the overall performance and lifetime of a battery stack within the battery can.

The various designs and methods disclosed herein provide for battery cans for any type of electrical device. It will be appreciated that, although some of the example implementations described herein involve the battery providing power to a type of electrical device, such as a cell phone or laptop computer, the battery designs and methods described herein may apply to any type of electrical device, computing system or mobile device where power from a battery may be desired to power the device. The battery cans and enclosures can be used for any battery configuration (e.g. battery stack) known in the art. As used herein, the term "battery stack" may include, but is not limited to, a stacked-electrode or wound jelly roll configuration. Further, any type of lithium ion cell may be used with the embodiments and designs of the battery can described herein.

Figure 2:
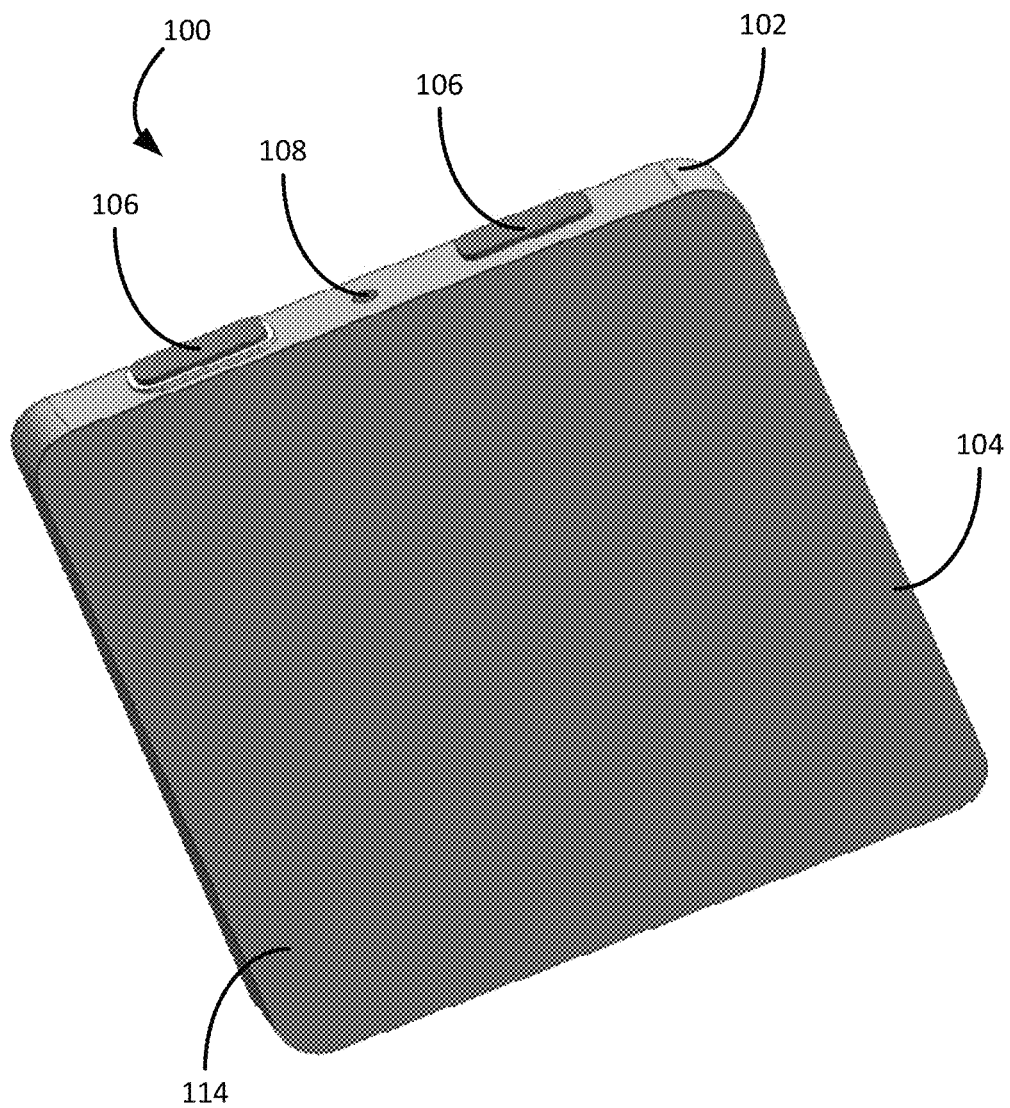
FIG. 2 is a second isometric view of the battery can of FIG. 1.

FIGS. 1 and 2 are isometric views of a battery can using two dish or clamshell shaped outer surfaces. In particular, the battery can 100 includes a first portion, or upper portion 102, that has an optionally flat or semi-flat surface 110 and four walls 112 that extend from the flat or semi-flat surface. In general, the dimensions (e.g., width and length) of the flat or semi-flat surface 110 are larger than the dimensions of the walls 112 such that the four walls are smaller in area than the larger flat or semi-flat surface to form a rectangular-shape with an opening along one of the larger surfaces of the rectangle. The regions of the first portion 102 where the surface 110 meets the four walls 112 may form an edge. In some embodiments the edge can have a right angle or may be rounded. Similarly, the regions of the first portion 102 where the four walls 112 meet may form a corner; in some embodiments the corner may be a right angle, an obtuse angle, an acute angle or may be rounded. In addition, one or more feedthroughs 106 may be located on a wall 112 of the first portion 102. The feedthroughs 106 provide electrical connections to a battery stack contained within the battery can 100. In addition, one or more fill holes 108 may also be located on a wall 112 of the first portion 102. The fill hole 108 may or may not be on the same wall 112 of the first portion 102 as the feedthroughs 106.

The battery can 100 may also include a second portion 104. In one embodiment, the second portion 104 includes a similar shape as the first portion 102, namely, a flat or semi-flat surface 114 and four walls that extend from the surface to form a rectangular-shape with an opening along one of the larger surfaces of the rectangle. In the embodiment, the length and width of the flat or semi-flat surface 114 may include slightly smaller dimensions than corresponding dimensions of the flat or semi-flat surface 110 of the first portion 102. Thus, when mated, the walls of the second portion 104 fit inside the walls 112 of the first portion 102 to form a box-like enclosure. In another embodiment, the second portion 104 includes the flat or semi-flat surface 114. In general, the dimensions of the flat or semi-flat surface 114 of the second portion 104, in this embodiment, are the same or similar to the flat or semi-flat surface 110 of the first portion 102 such that, when mated, the first and second portion of the battery can form a box-like enclosure for housing a battery stack.

Figure 3A:
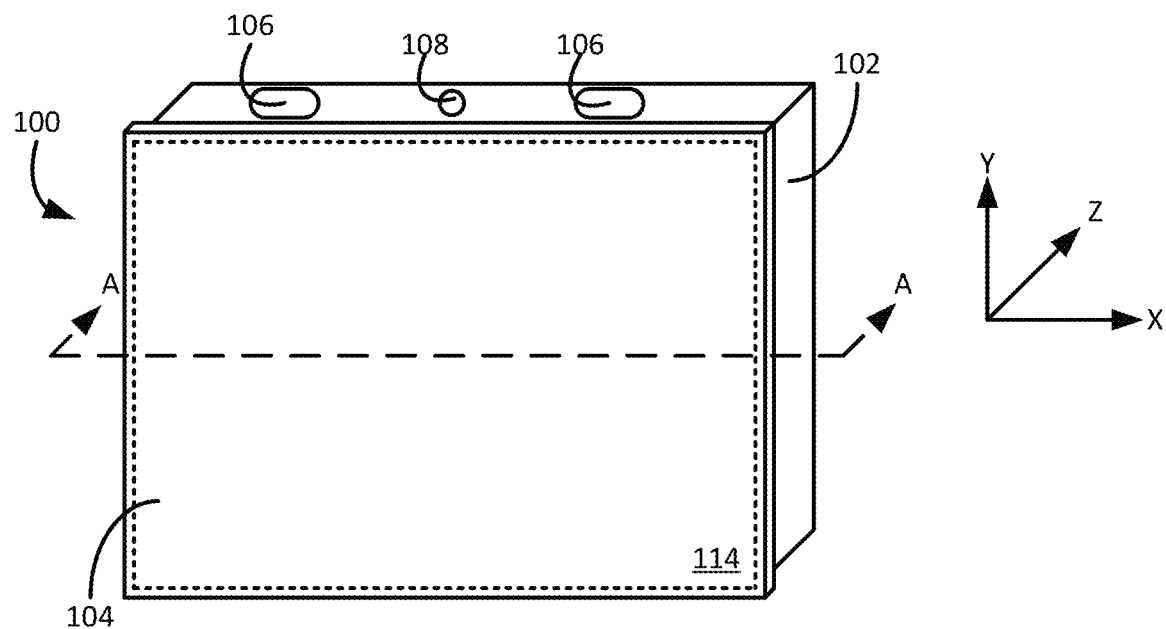
FIG. 3A is an isometric view of a battery can using two rectangular pieces seam welded together.

As should be appreciated from the figures, before the portions 102, 104 of the battery can 100 or battery can are mated, the portions may be mated along an axis perpendicular to the larger surface 110 of the first portion and/or the larger surface 114 of the second portion. As shown in FIG. 3A, this axis perpendicular to the larger surfaces 110, 114 of the portions is referred to herein as the "z-axis" of the battery can 100. In particular, FIG. 3A is an isometric view of a battery can 100 using the two portions 102, 104 welded together to form an enclosure. Similar to the embodiments discussed above, the battery can 100 design of FIG. 3A includes a first portion 102 and a second portion 104. The first portion 102 includes one or more feedthroughs 106 and a electrolyte fill hole 108. Further, the second portion 104 engages with the first portion 102 to form an enclosure for a battery stack. As shown in relation to the coordinate axis of FIG. 3A, the flat surface 110 of the second portion 104 (and the flat surface 114 of the first portion 102) lie or partially lie in the X-Y plane, with the walls of the first portion and the second portion lying or partially lying in the Z-plane. As should be appreciated, the coordinate axis of FIG. 3A is used merely as a reference tool for the battery can 100 design and should not be considered to be indicative of any type of direction or orientation of the battery can in relation to an electronic device utilizing the battery can.

Figure 3B:
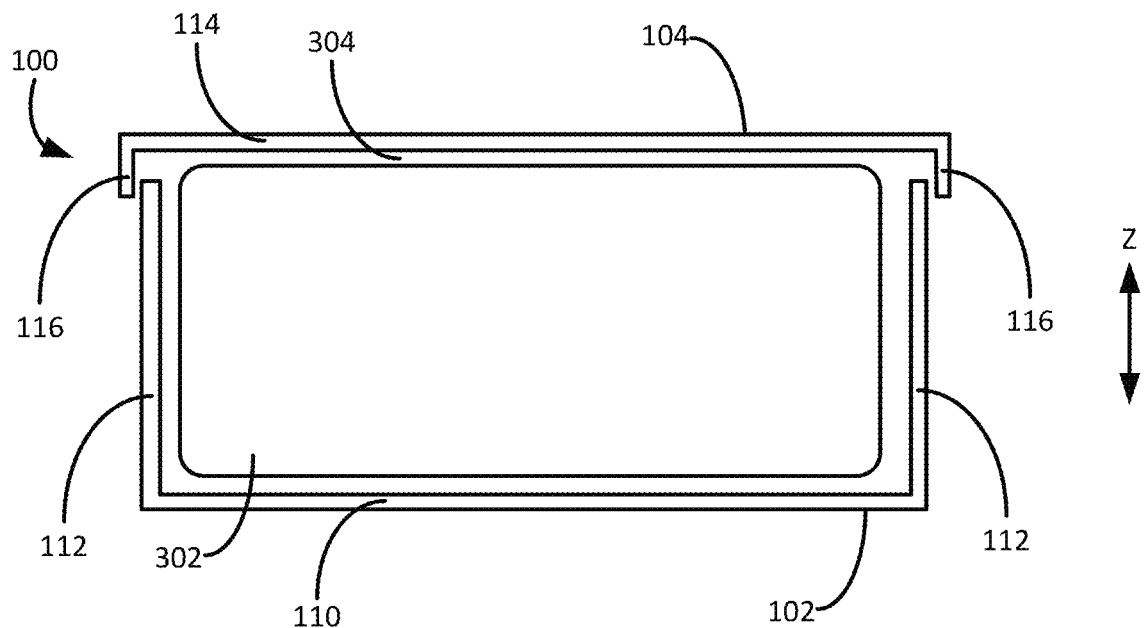
FIG. 3B is a cross-section view of the battery can of FIG. 3A along view line AA.

FIG. 3B is a cross-section view of the battery can 100 of FIG. 3A along view line AA. Similar to the embodiments discussed above, the battery can 100 or can includes a first portion 102 with a semi-flat surface 102 and walls 112 projecting from the semi-flat surface. In general, the semi-flat surface 110 may lie partially in the X-Y plane with the walls 112 lying along the Z-axis at least partially perpendicular to the semi-flat surface. As discussed in more detail below, the semi-flat surface 110 and the walls 112 of the first portion 102 may be of a particular thickness. Similarly, the battery can 100 includes a second portion 104 with a semi-flat surface 114 lying partially in the X-Y plane and walls 116 projecting from the semi-flat surface lying along the Z-axis at least partially perpendicular to the semi-flat flat surface. Also, the semi-flat surface 114 and the walls 116 of the second portion 104 may also be of a particular thickness.

The first portion 102 and the second portion 104 are oriented with respect to each other such that the semi-flat surfaces 110, 114 and the walls 112, 116 form an enclosure. In the particular embodiment illustrated in FIG. 3B, the walls 116 of the second portion 104 are outside the walls 112 of the first portion 102 in relation to the center of the enclosure when the portions are mated. In other embodiments, the walls 116 of the second portion 104 may be inside the walls 112 of the first portion 102, such as in the embodiment of the can 100 illustrated in FIGS. 1 and 2. In yet another embodiment, the walls 112, 116 of the portions 102, 104 may lie in the same plane and meet at the end of the walls to form the seam of the enclosure. Regardless of the embodiment, a battery stack 302 may be included in the enclosure formed by the first portion 102 and the second portion 104. In general, the battery stack 302 is a single long sandwich of positive electrode, separator, negative electrode and separator folded into a stack to fit within the battery enclosure. To provide power from the battery, lithium ions typically move from the negative electrode to the positive electrode during discharge and back when charging. Further, as discussed in more detail below, an electrolyte is introduced into the battery pack 100 which allows for the ionic movement between the electrodes.

Figure 4:
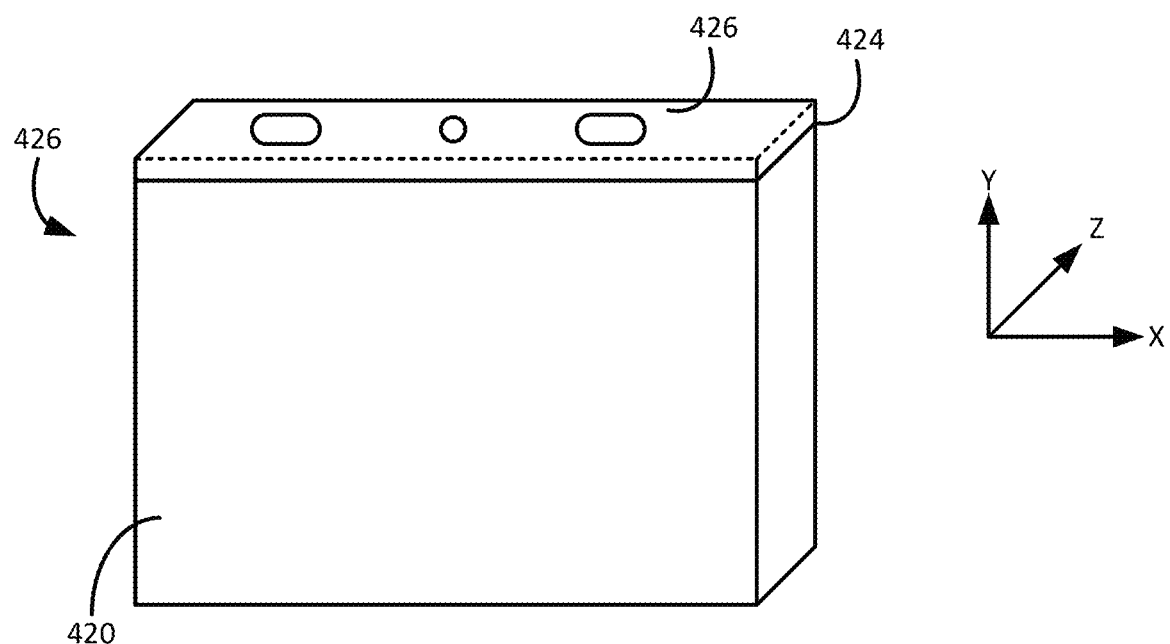
FIG. 4 is an isometric view of another battery can using two portions seam welded together along a Z-X-axis perimeter of the can.

As discussed, the battery can design 100 includes two portions 102, 104 with semi-flat surfaces 110, 114 in an X-Y plane with the walls extending along a Z-axis. Thus, to create the enclosure, the two portions 102, 104 may be brought together along the Z-axis and a weld seam may be created around a perimeter in the X-Y plane to seal the enclosure. This orientation of the seam is an improvement over conventional designs for prismatic battery cans. For example, FIG. 4 is an isometric view of a battery can using two portions welded together in a Z-X-plane around the perimeter of the can. In particular, the battery can 426 includes a rectangular-shaped portion 420 that is open on one end of the portion. A second portion 422 is attached to the open end of the first portion to create the battery can enclosure. In this example, the seam is in the Z-X plane around the perimeter of the can 426. As shown, the battery can 426 separates or comes together along the Y-axis such that a battery stack may be inserted into the first portion 420 and the lid or second portion 422 is placed on the first portion and the can is closed. However, as described in more detail below, this particular battery can design 426 has several disadvantages in comparison to the battery can 100 that includes a mating seam around the perimeter of the can in the X-Y plane. In particular, due to the nature of the construction of the first portion 420 of conventional battery can 426 of FIG. 4, several aspects of the thickness and dimensions of the walls of the first portion in relation to the battery stack included in the battery can enclosure may limit the effectiveness and performance of the battery can.

One battery performance advantage obtained through the battery can design of FIGS. 1-3B is a reduced clearance gap between the dry battery stack 302 and the second can portion 104. In the more traditional battery can design 426 (such as that shown in FIG. 4), the battery stack of the battery is slid into the enclosure. However, due to the inconsistencies in the wall thickness of the conventional battery can 426, it is often the case that a large gap exists between the battery stack and the walls of the battery can 426. In contrast, the battery can design 100 of FIGS. 1-3B reduces the gap between the battery stack 302 and the walls of the battery can. In particular, because the first portion 102 and the second portion 104 are mated along the Z-axis, the wall tolerances of the larger semi-flat surfaces between the can and the battery stack may be more closely controlled and/or reduced than in previous can designs. Large variations in tolerance between the can and the battery stack of the larger semi-flat surface may increase damage to the battery stack as the stack swells during operation of the battery. The additional control over the wall tolerances of the first portion 102 and the second portion 104 achievable through the battery can design discussed herein may allow for the stack to conform more closely to the interior shape and dimensions of the battery can 100 enclosure. This includes a reduced gap between the battery stack 302 and the inner wall surfaces of the battery can. For example and as shown in FIG. 3B, a small gap 304 between the battery stack 302 and the inner surface of the large portion 114 of the second portion 104 of the battery can design 100 may be obtained. Similar reduced gaps may also be present between the battery stack 302 and each of the inner surfaces of the battery can 100. Additionally, as the battery stack 302 swells, either when the electrolyte is introduced into the battery can enclosure or during use of the battery stack, the gap between the stack and the inner surfaces of the can design may be further decreased. In some embodiments, the battery stack 302 may be in contact with one or more of the inner surfaces of the battery can 100 enclosure.

The reduced gap 304 between the battery stack 302 and the inner surfaces of the enclosure of the battery can 100 can be used to increase pressure on the battery stack during use of the battery. In general, increased pressure on the battery stack 302 as the battery swells during use may prolong the life of the battery cell and, thereby, increase the performance of the battery. Thus, a reduced gap between the battery stack 302 and the inner surfaces of the enclosure of the battery can 100 may help contain the amount of swelling of the battery stack during use. Additional features may also be included in the battery can design 100 to maintain or increase the pressure placed on the battery stack 302 of the battery cell, as discussed in more detail below.

Figure 5:
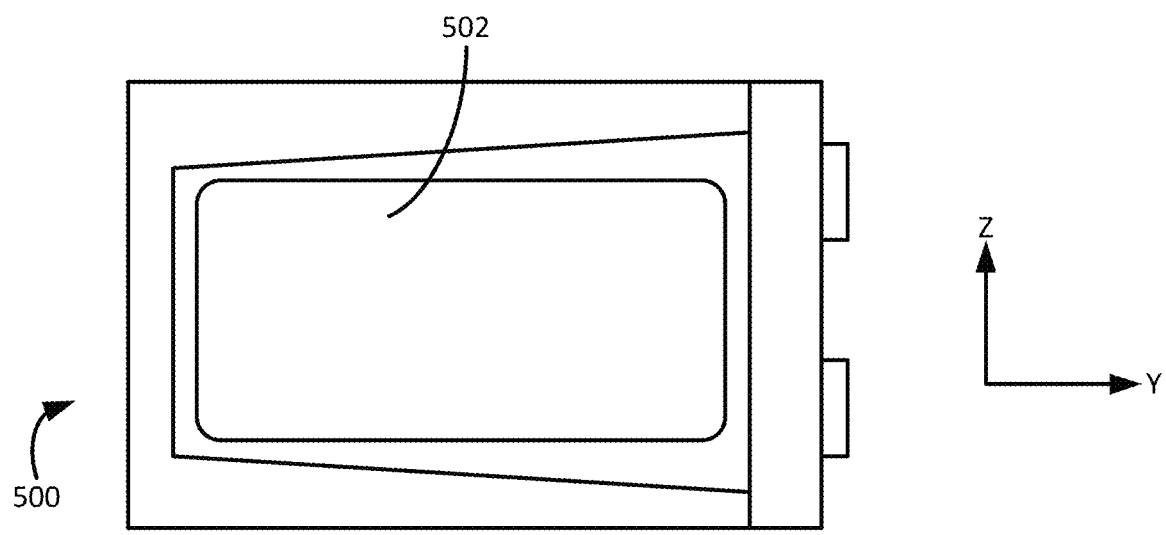
FIG. 5 is a cross-section view of a conventional prismatic battery can.

In addition to reducing a gap between the battery stack 302 and the inner surfaces of the enclosure of the battery can 100, the battery can design can provide a more uniform pressure on the stack. In particular, because the direction of the draw of the battery can 100 is in the Z-axis direction (which is the same direction as the swell of the battery stack 302), the pressure distribution along the battery stack is can be more uniformly applied. This is in contrast to conventional prismatic cell designs. For example, FIG. 5 is a cross-section view of a conventional prismatic battery can 500. As can be appreciated from the cross-section, swelling in the Z-axis direction of the battery pack 502 within the enclosure of the battery can 500 may cause pressure on the stack to be non-uniform. In particular, the battery stack 502 may swell more on the right side of the battery can 500 shown than on the left side due to irregularities in the can wall construction process. In contrast, the can design 100 of FIGS. 1-3B provides a more uniform pressure applied to the battery stack 302. More particularly, because the portions 102, 104 of the battery design 100 are mated along the Z-axis, the construction of the inner surface of the first portion and the second portion may be more closely controlled. This results in more uniform thickness along the semi-flat larger surface 110, 114 of the portions 102, 104 that may be closer to parallel to each other when compared to the inner surfaces of the prismatic battery can 500 of FIG. 5. Thus, as the battery stack 302 swells, the pressure applied to the battery stack by the inner surfaces of the battery can 100 is more uniform than in conventional prismatic battery can designs.

Figure 6:
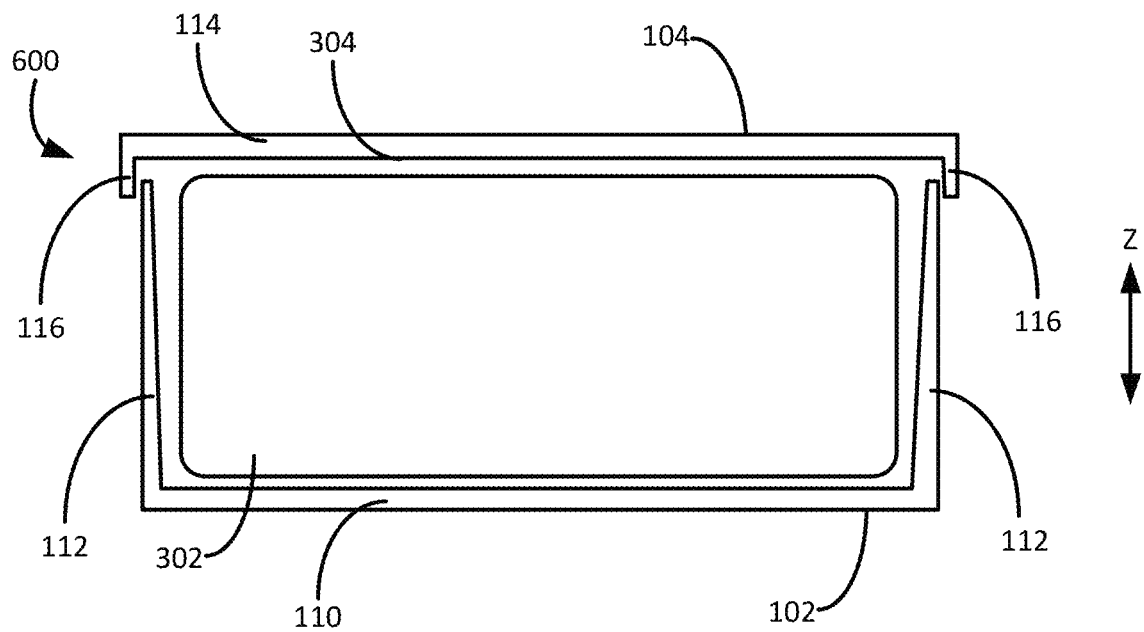
FIG. 6 is a cross-section view of a battery can illustrating varying wall thickness of the can enclosure.

As mentioned, the design of the battery can 100 described herein allows for more control of the construction of the battery can. For example, the design 100 allows for the ability to modify the thickness ratios of the walls of the battery can. In one particular embodiment illustrated in FIG. 6, the semi-flat surface 110 of the first portion 102 and the semi-flat surface 114 of the second portion 104 are thicker than the walls 112, 116 of the can design 600. The thicker larger surfaces 110, 114 may provide a stronger resistance to the Z-swelling of the battery stack 302 while the thinner walls 112, 116 provide for more cell capacity. In the embodiment illustrated in FIG. 6, the thinner walls 112, 116 of the can 600 may be achieved by tapering the thickness of the walls along the length of the walls. In general, however, the thickness of the walls of the can design 600 may be any thickness as desired in response to battery performance and overall cell capacity.

Similarly, the thickness of any of the walls 112, 116 or the larger, semi-flat surfaces 110, 114 of the first portion 102 and the second portion 104 of the battery can 100 may be thinner than in conventional prismatic battery can designs. In various aspects, by utilizing strong materials such as stainless steels or titanium to form the first portion 102 and/or second portion 104, the thicknesses of the portions may be reduced to increase the overall cell capacity when compared to conventional prismatic battery cell designs. One consideration when determining the thickness of the portions 102, 104 of the battery can 100 is the ability of the battery to draw energy from the battery stack 302. In general, as the thickness of the walls of battery increase, there can be a reduction in the potential energy draw from the battery stack 302. However, reducing the thickness of the wall should be balanced with the fact that thinner walls may not provide adequate strength for applying pressure to the battery stack 302 to reduce swelling of the stack. The balance between the ability to draw energy from the stack while still providing adequate strength may be considered when determining the thickness of the portions 102, 104 of the battery can 100. In one embodiment, the battery can 100 may include a can tolerance of +/−0.1 mm in the X-Y plane and a +/−0.05 mm along the Z-axis. However, the wall thicknesses of the portions of the can 100 may be any dimension as determined by a designer of the battery can.

Figure 7:
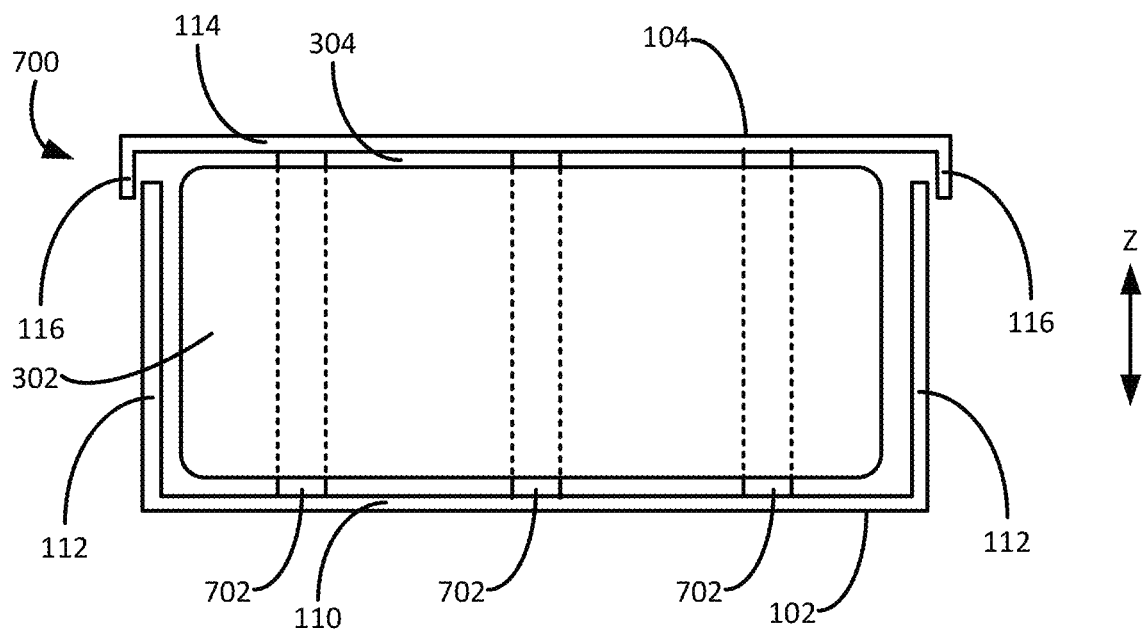
FIG. 7 is a cross-section view of a battery can illustrating a plurality of support structures within the can.

Additional features to apply a pressure to the battery stack 302 or otherwise resist battery stack swelling may also be included in the battery can 100 design. Such features may be used in addition to the other features discussed herein or used separately from one or more other features. One such feature includes one or more support columns located within the battery can 100 enclosure. FIG. 7 is cross-section view of a battery can 700 illustrating a plurality of support structures 702 within the can. In general, the can 700 includes similar portions as described above, namely a first portion 102 with a larger semi-flat surface 110 and walls 112 and a second portion 104 with a larger semi-flat surface 114 and walls 116. Included in the enclosure created by the first portion 102 and the second portion 104 is a battery stack. A seam connecting the first portion 102 and the second portion 104 may be present around the X-Y perimeter of the can 700, as described above.

Also mentioned above, the battery stack 302 may swell along the Z-axis during the lifetime of the battery cell 700. To resist or otherwise account for the stack 302 swelling, the battery can 700 may include one or more support columns 702 between the large surface 110 of the first portion 102 and the large surface 114 of the second portion 104. The support columns 702 may connect or otherwise attach to an inner portion of the larger surfaces 110, 114 such that, as the battery stack 302 swells, the columns prevent the larger surfaces from bowing outward from the can enclosure. The support columns 702 may attach to the inner portions of the larger surfaces 110, 114 through any known or hereafter developed method, including but not limited to, welding, adhesive, screws, and the like.

In general, the support columns 702 extend through the battery stack 302 between the semi-flat larger surfaces 110, 114 of the can 700. Thus, one or more holes may be made within the battery stack 302 at the location of the one or more support columns 702. During construction of the battery cell, the battery stack 302 is placed into the enclosure of the battery can 700 around one or more of the support columns 702. The support columns may then be attached to one or more of the inner portions of the large surfaces 110, 114. In one embodiment, the support columns 702 may be coated with an insulating material to prevent electrical contact between the battery stack 302 and the support column 702. In other embodiments, the support columns 702 are in electrical communication with the battery stack 302 and the larger surfaces 110, 114 of the can 700. In another embodiment, the support columns 702 may be hollow and extend to the outer portion of the larger surfaces 110, 114 of the battery can 700. Thus, each of the larger surfaces 110, 114 of the battery can 700 may include holes that extend through the battery can. These holes (with or without threads) may be used as holes for screws to mount the battery cell 700 into a device or to run coolant through to aid in maintaining a proper operating temperature of the battery cell. In general, the holes through the battery cell 700 created by the support columns 702 may be filled or unfilled for any purpose.

FIGS. 8A-8F are illustrations of several support structures within a battery can. The examples illustrated in FIGS. 8A-8F are but some of the possible configurations that may be used for the support columns 702 described above. For example, the support column 702 of FIG. 8A includes the first portion 102 and the second portion 104 of the battery can 700 described above with relation to FIG. 7. The support column 802 includes a column that extends from the first portion 102 and is connected or adhered to the inner surface of the second portion 104. In one particular example, the column 802 may be spot welded to the inner surface. In another example of the support column 804 illustrated in FIG. 8B, the column 804 extending from the first portion 102 may extend through the second portion 104 and ending at the outer surface of the second portion. As described above, the support columns 802, 804 may be solid or hollow.

Figure 8A:
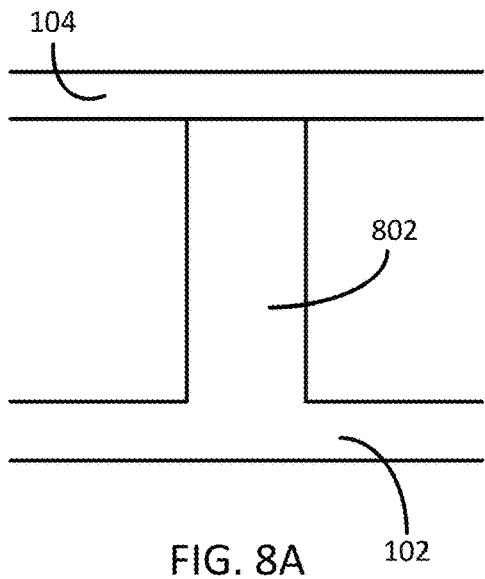
FIGS. 8A-8F are illustrations of several support structures within a battery can.
Figure 8B:
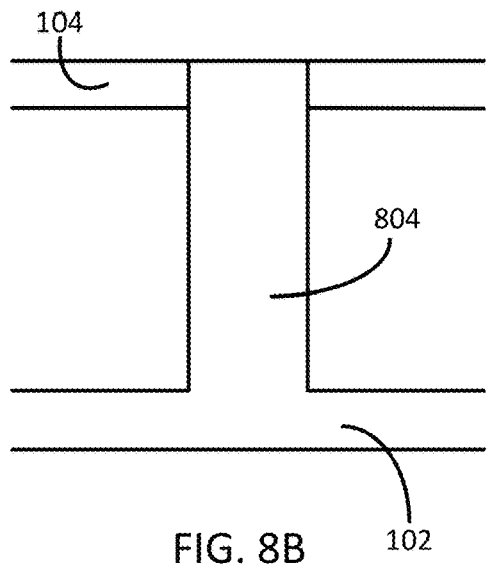
Figure 8C:
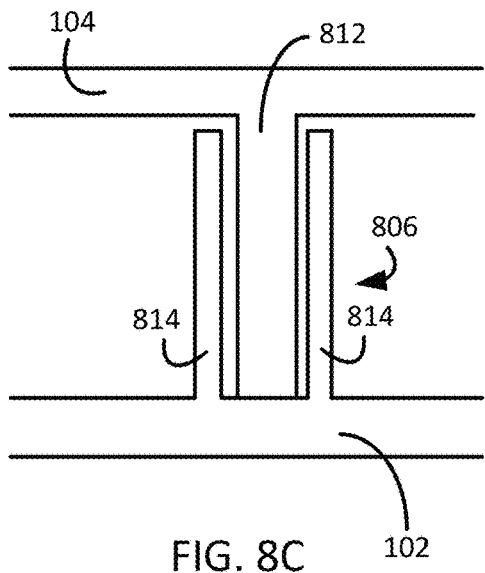
Figure 8D:
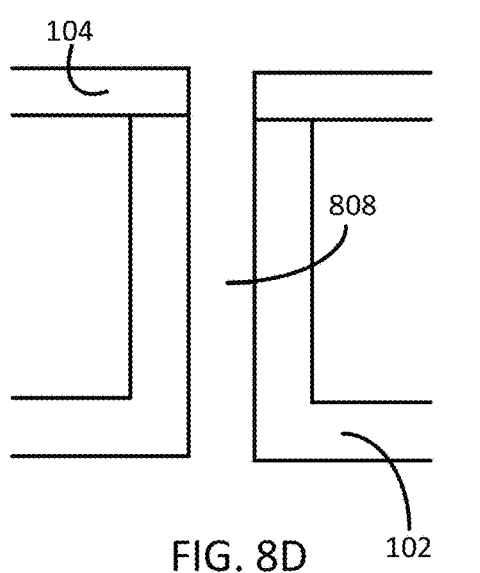
Figure 8E:
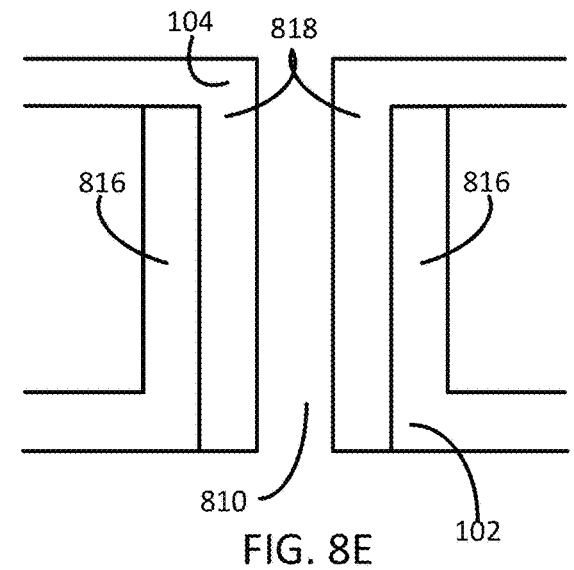
Figure 8F:
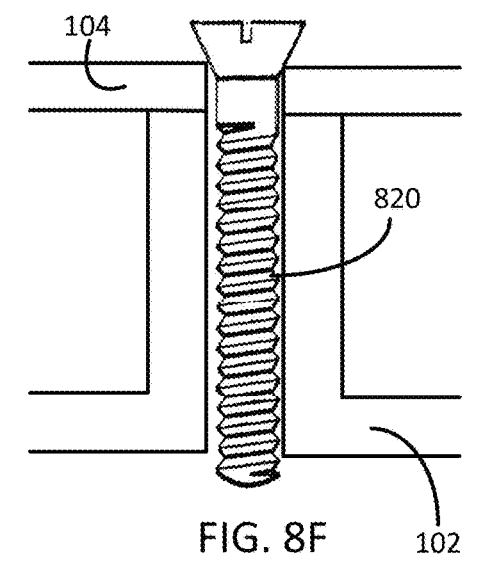

In the embodiment illustrated in FIG. 8C, the support structure 806 includes a column 812 extending from the second portion 104 and a corresponding hollow cylinder 814 extending from the first portion 102. The column 812 from the second portion 104 is oriented to slide into the cylinder 806 of the first portion 102 to create the support structure 806. Similar to above, the column 812 may be solid or hollow and may or may not extend through the first portion 102. FIG. 8D illustrates yet another embodiment of the support column 702 of the battery can 700. In particular, the can includes a hollow cylinder 808 from the outer portion of the first portion 102 to the outer portion of the second portion 104. Any joint between where the hollow cylinder 808 meets the first and second portion may be spot welded or otherwise attached to create the hole through the battery can. In a similar structure 810 illustrated in FIG. 8E, the first portion 102 includes a hollow cylinder 816 that extends towards the second portion 104. The second portion 104 includes a similar hollow cylinder 818 that extends toward the first portion. The cylinder 818 of the second portion 104 is sized to fit into the cylinder 816 of the first portion 102. When brought together such that the cylinder 818 of the second portion 104 is inside the cylinder 816 of the first portion 102, a support column 810 creates a hole through the battery can. Further, as discussed above, a hollow support structure may be utilized as holes for screws to mount the battery cell 700 into a device. One particular example of the hollow support structure utilized for a screw hole through the battery cell is illustrated in FIG. 8F. It should be appreciated the support structures of FIGS. 8A-8F are but some examples of the many types of support columns 702 that may be used in conjunction with the battery can 700 design discussed herein.

The battery can 100 may include still other features that may help in responding to swelling of the battery stack 302. For example and as shown in FIGS. 9A and 9B, the battery can 900 may include a bossing feature 902 on at least one surface of the battery can to apply pressure to the battery stack 302 contained within the can enclosure, even during deformation of the can due to battery stack swelling. In the embodiment shown in FIGS. 9A and 9B, the bossing feature 902 is located on the larger surface 114 of the second portion 104. However, the bossing feature 902 may be located on any surface of the battery can 900. In general, the bossing feature 902 includes biasing at least a portion of a surface of the battery can 900 to extend into the enclosure of the can to apply pressure to the battery stack 302. As seen in the top view of the battery can 900, the bossing feature 902 may be shaped to approximate the shape of the battery stack 302 to which the bossing feature applies pressure. However, the bossing feature 902 may be any shape on the surface or surfaces of the battery can 900.

Figure 10C:
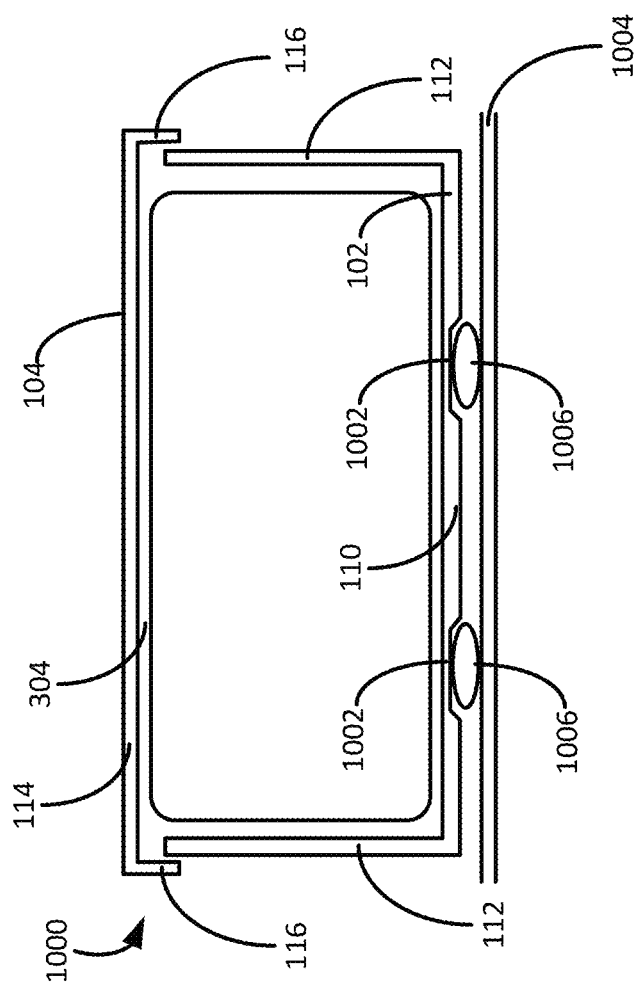
FIG. 10C is a cross-section view of a battery can illustrating the can mounted on a surface of a computing device.

Similarly and as shown in FIGS. 10A and 10B, the battery can 1000 may include one or more localize thinning features 1002 in one or more surfaces of the battery can. In the embodiment shown in FIGS. 10A and 10B, the thinning feature 1002 is located on the larger surface 110 of the first portion 102 to provide a location and/or make room in the larger surface for one or pressure sensitive adhesives (PSAs) that are utilized to mount the battery can in an electronic device. As shown in FIG. 10C, the thinning feature 1002 provides a thinner portion 1002 of the battery can surface for mounting or otherwise attaching the battery cell 1000 to a surface 1004 of a computing device. In the example shown, the battery cell 1000 is mounted to the computing device surface 1004 through one or more PSAs 1006. However, the thinning feature 1002 may be located on any surface of the battery can 1000. In another example, the thinning feature 1002 may be located on the larger surface 114 of the first portion 104 to form one or more ribs or other features in the surface of the battery can 1000. In general, the thinning feature 1002 may be created on the surface of the battery can 1000 through any method known or hereafter developed for thinning a surface of a device, such as ablation, coining, etching, and the like.

In yet another embodiment, one or more of the outer surfaces of the can may include a bossing feature to improve the structural integrity of the can sides and resist twisting and warping of the can sides. In particular, the battery can may be constructed of thin stainless steel sides, such as 75 µm in some embodiments. The thinness of the battery can may cause the can to twist or warp such that the can may not retain its intended shape after manufacturing. Such warping may be caused by the expansion of the battery can as discussed above. Further, warping may cause issues during the welding of the two halves of the battery can, leading to improper welds. By improving the structural rigidity of the battery can sides, these issues may be avoided.

Figure 10E:
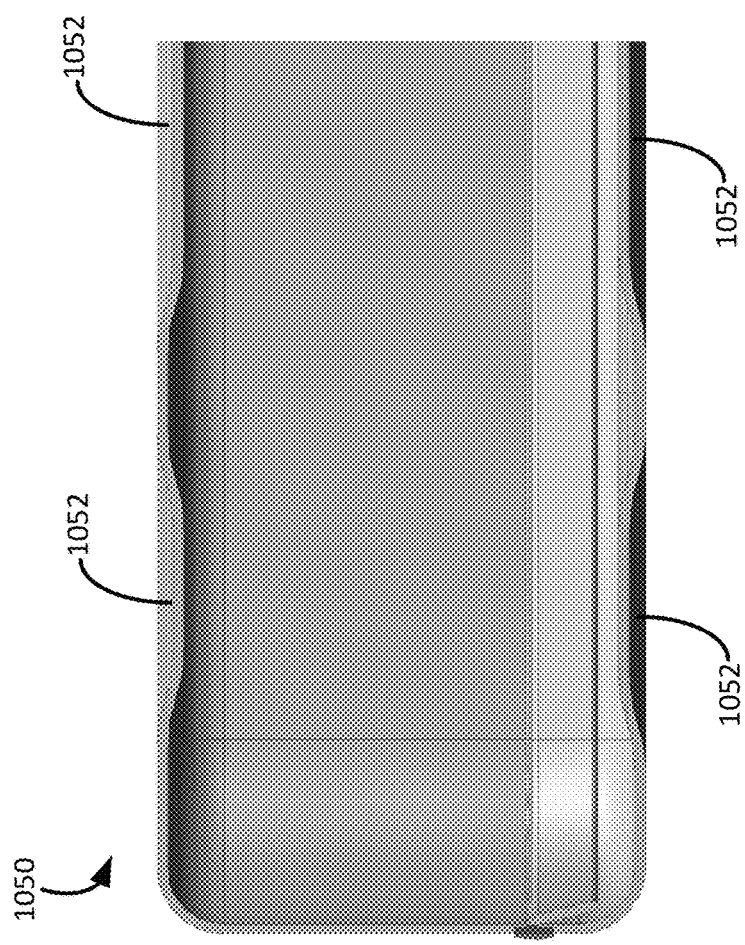
FIG. 10E is a cross-section view of a battery can with the second type of embossing feature on the outer surface of the battery can.
Figure 10D:
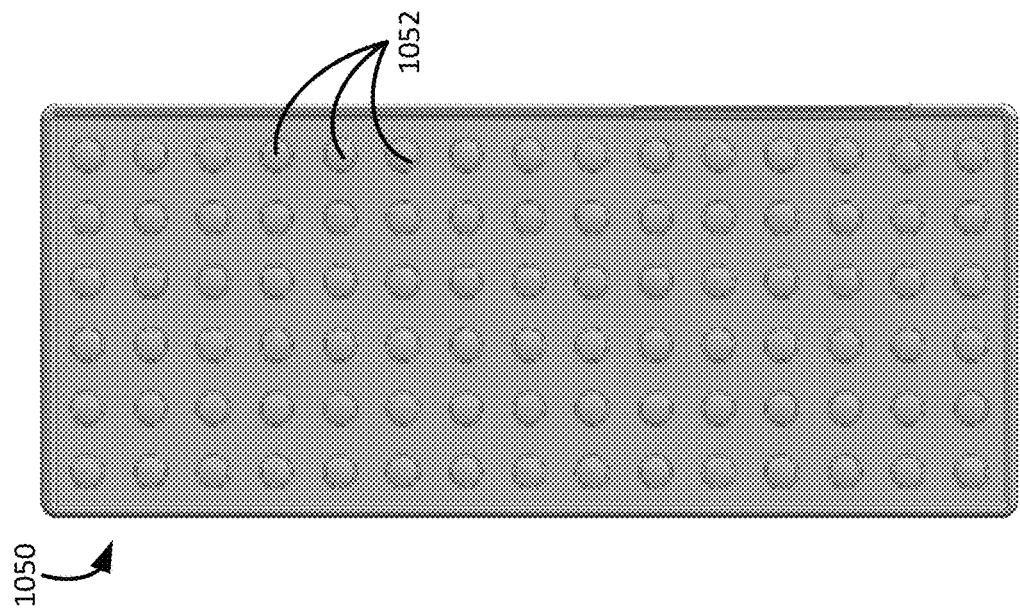
FIG. 10D is a top view of a second type of an embossing feature on an outer surface of a battery can.

FIG. 10D is a top view of a particular pattern of an embossing feature on an outer surface of a battery can to improve the structural rigidity of the sides of the can. In the example illustrated, a pattern of dimples 1052 is included on the top surface of the can 1050. Although illustrated on the top surface of the can 1050, it should be appreciated that such a bossing feature may be included on any outer surface of the can to increase the structural rigidity. Further, while the dimples 1052 of the embossing feature illustrated in FIG. 10D are illustrated as uniformly spread apart, the embossing feature may be present on the surface in any manner, including disposing the bossing feature on only a portion of the surface. Other types of embossing features are discussed below and illustrated in FIGS. 10E-10H.

FIG. 10E is a cross-section view of a battery can with the dimpled embossing feature 1052 on the outer surface of the battery can 1050. As shown, the dimples 1052 of the embossing feature cause one or more indentions into the interior of the can assembly to increase the area moment of inertia in the thickness direction of the can 1050. Through this increase in area moment in the thickness direction, the can's area moment of inertia is also increased thereby improving the structural rigidity of the sides of the can assembly 1050. In this manner, twisting or warping of the battery can 1050 may be reduced.

Figure 10G:
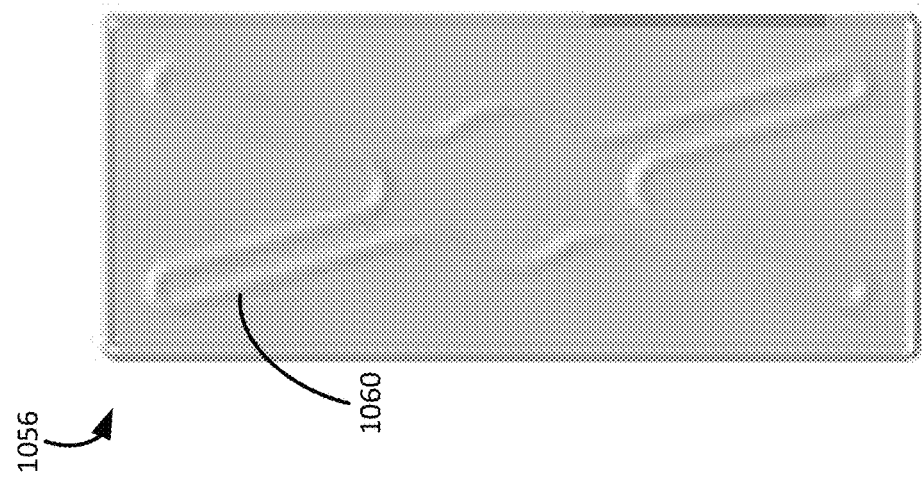
FIG. 10G is a top view of a fourth type of an embossing feature on an outer surface of a battery can.
Figure 10F:
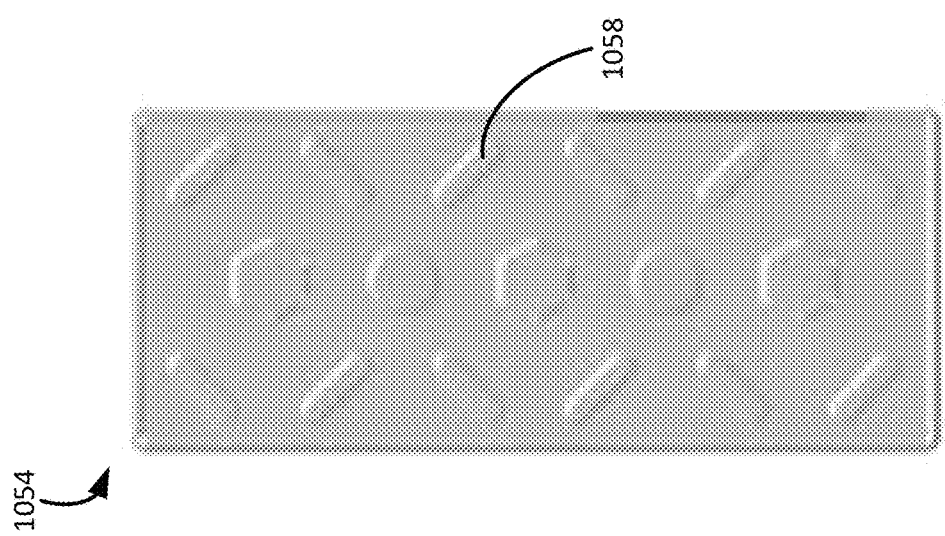
FIG. 10F is a top view of a third type of an embossing feature on an outer surface of a battery can.

FIG. 10F is a top view of a first type of a beaded embossing feature 1058 on the outer surface of a battery can 1054 and FIG. 10G is a top view of a second type of a beaded embossing feature 1060 on the outer surface of a battery can 1056. The beaded designs included in the illustrations are just some of the possible beaded designs that may be included in the can surface to improve the structural integrity of the can.

Figure 10H:
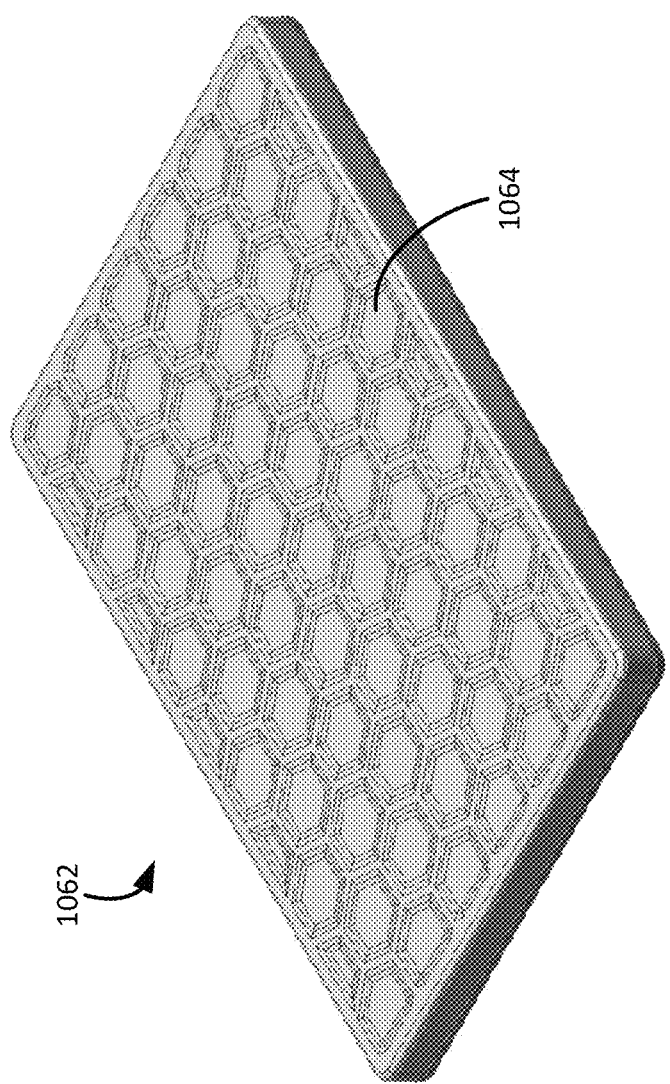
FIG. 10H is an isometric view of a fifth type of embossing feature on an outer surface of a battery can.

In another example, FIG. 10H shows an isometric view of a hexagonal pattern embossing feature 1064 on an outer surface of a battery can 1062. Other possible designs are also contemplated, such as squares, triangles, and the like. In addition, other embossing features, such as one or more ribs along the surface, may be utilized with the battery can. In general, any type and number of embossing features may be included on the outer surface of the battery can to improve the structural integrity of the battery can to resist warping and/or twisting of the battery can sides. It should be appreciated that such embossing features are not limited to the examples described herein.

Further, the embossing feature may be included on a battery can of any shape and size. For example, the battery can surface 1062 illustrated in FIG. 10H may include a small portion that extends out from the main portion of the battery can. Also, in some embodiments, the embossing feature may be associated with one or more features of an enclosure in which the battery can is mounted. For example, a computing device may include an enclosure on the interior of the device. The interior surface of the computing device may include one or more features, such as beaded features that are complimentary to the beaded embossing features illustrated in FIGS. 10F and 10G. In other words, the battery can may include an embossing feature that mirrors or compliments a similar embossed feature on the interior surface of the enclosure in which the battery can is located. By including an embossing feature on the outer surface of the battery can that mirrors and mates with a corresponding feature on the interior surface of an enclosure, the space consumed by the battery can within the enclosure may be reduced while increasing the rigidity of the battery can. In addition, friction between the embossing feature on the battery can and the corresponding feature on the enclosure may act to hold the battery can in place within the enclosure.

As mentioned above, the battery can 100 design described herein may include a seam around an X-Y perimeter of the can. This seam is generally the location in which the first portion 102 and the second portion 104 of the can design meet and are sealed to create the battery cell. In one embodiment, this seal around the seam is created through a laser welding procedure that welds the two portions together. However, the battery stack 302 located within the enclosure of the battery can 100 may be sensitive to the heat used to create the seam around the battery can. Thus, the battery can 100 may include one or more features that account for the heat of the welding process to protect the battery stack 302 within the battery can 100.

Figure 11:
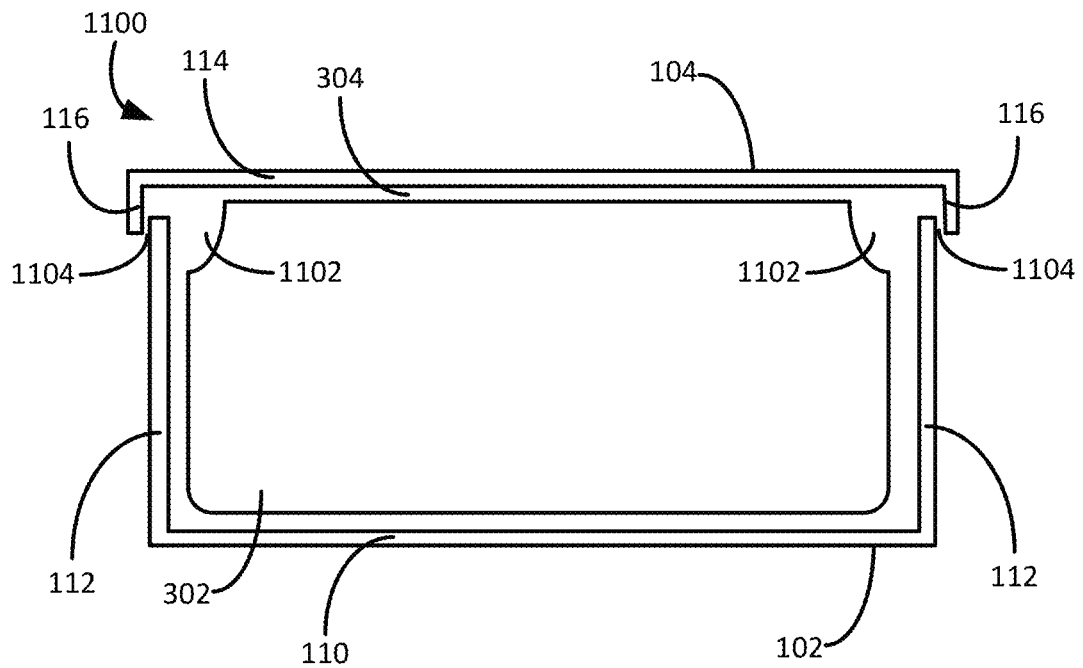
FIG. 11 is a cross-section view of a battery can illustrating a localized electrode reduction feature of the battery stack of the can.

For example, FIG. 11 is a cross-section view of a battery can 1100 illustrating a localized electrode reduction feature 1102 of the battery stack 302 of the can 1100. In general, the localized electrode reduction feature 1102 includes a reduction of the electrodes of the battery stack 302 directly behind or near the weld seam 1104 of the battery can 1100. The reduction 1102 increases the gap between the inner surface of the enclosure where the weld seam 1104 is located around the perimeter of the battery can 1100. This reduction 1102 to the electrodes of the battery stack 308 may be limited to the area near the weld seam 1104 to minimize the reduction in the capacity of the battery cell.

Figure 12A:
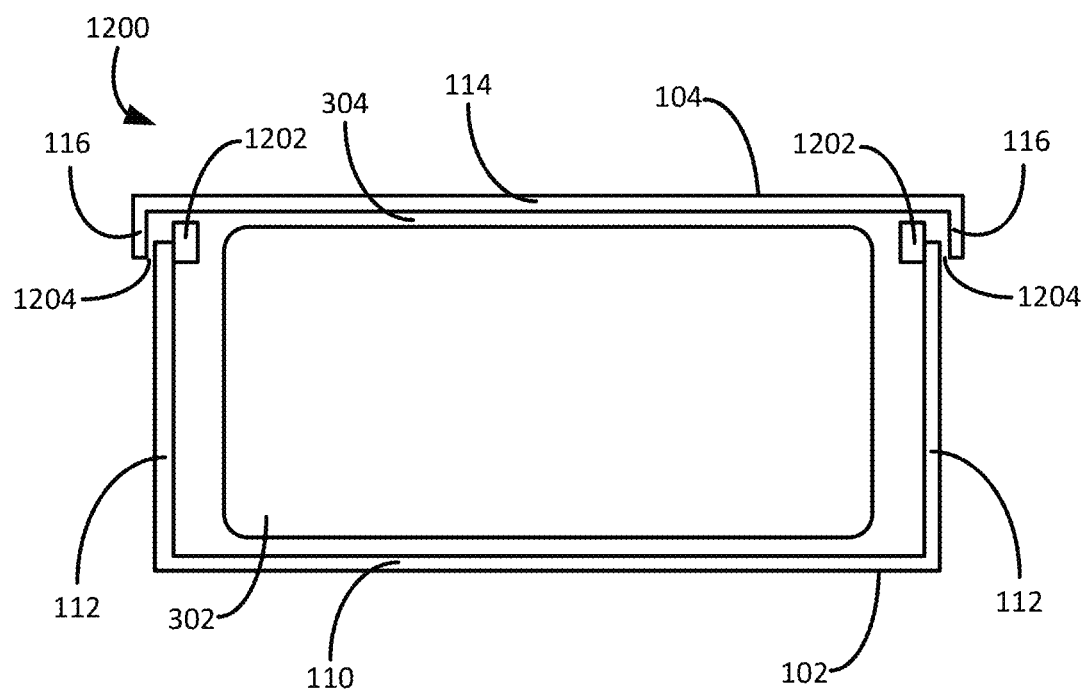
FIG. 12A is a cross-section view of a battery can illustrating a first embodiment of a protective backing feature along a seam of the can.

In addition, the battery can may include a welding shield or backing located in or near the enclosure around the weld seam to block or minimize the light/heat entering the enclosure during the welding process. For example, FIG. 12A is a cross-section view of a battery can 1200 illustrating a first embodiment of a protective backing feature 1202 located along a back of a weld seam 1204 of the can. In one embodiment, the backing feature 1202 is a metal backing that absorbs at least some of the light/heat/radiation of the laser welding process. The metal backing may be joined to the interior surface of the enclosure of the battery can 1200 at or near the weld seam 1204. In another embodiment, the backing feature 1202 is a ceramic material that absorbs the laser radiation and is generally more conductive to provide thermal insulation between the weld seam 1204 and the battery stack 302. In other embodiments, backing feature 1202 material may be a polymer material that provides a similar thermal insulation than the ceramic backing. It yet another embodiment, the backing feature 1202 may include two or more materials. For example, the backing feature 1202 may include a metal portion to absorb light/heat/radiation from the welding process with a ceramic or polymer portion to hold the metal portion in position near the seam 1204. It should be appreciated, however, that the embodiments provided herein are merely examples and the backing feature 1202 may be comprised of any material and a combination of any number of materials.

Figure 12B:
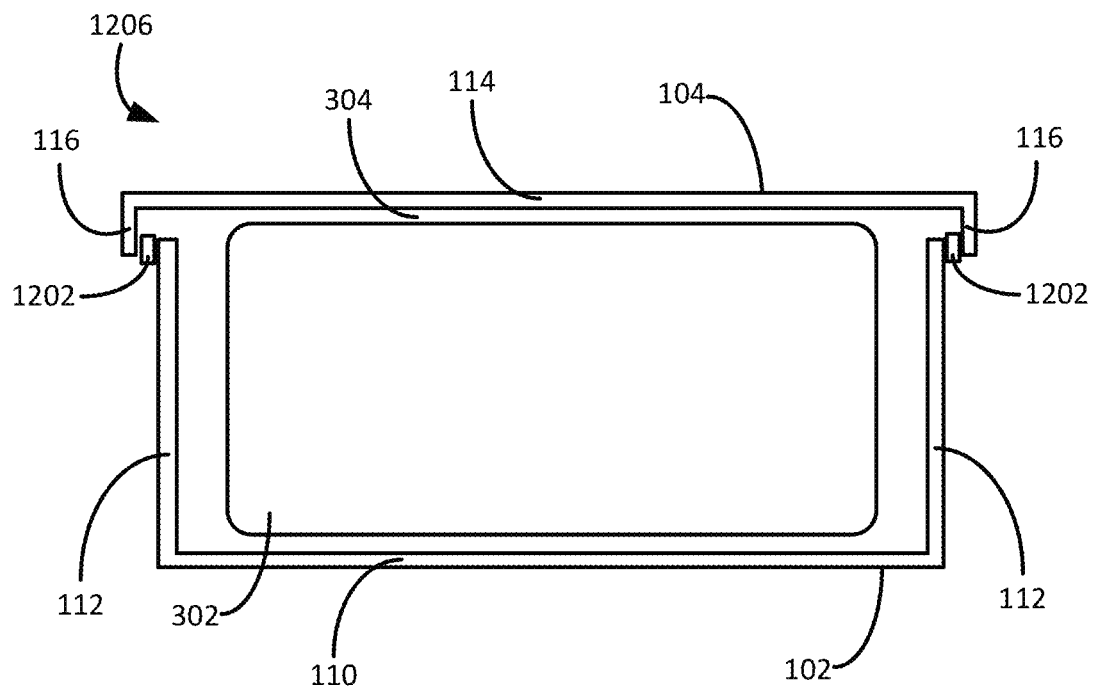
FIG. 12B is a cross-section view of a battery can illustrating a second embodiment of a protective backing feature along a seam of the can.

Although discussed above as being adhered to the inner surface of the enclosure of the battery can 1200 at or near the weld seam 1204, the backing feature 1202 may be located near the weld seam through other methods. For example, FIG. 12B is a cross-section view of a battery can 1206 illustrating a second embodiment of a protective backing feature 1202 along a seam 1204 of the can. In this example, the backing feature 1202 is pressure fit or squeeze fit between the walls 112 of the first portion 102 and the walls 116 of the second portion 104. By pressure fitting the backing material 1202 into the space between the walls 112, 116, the material does not need to be adhered to the surface of the enclosure to provide the protective feature of the backing. In such a case, a material that absorbs more radiation/light/heat may be selected regardless of the materials tendency to adhere to the metal surface of the battery can. In another example, the backing material 1202 may be brazed within the seam to hold the backing material in place.

Figure 13A:
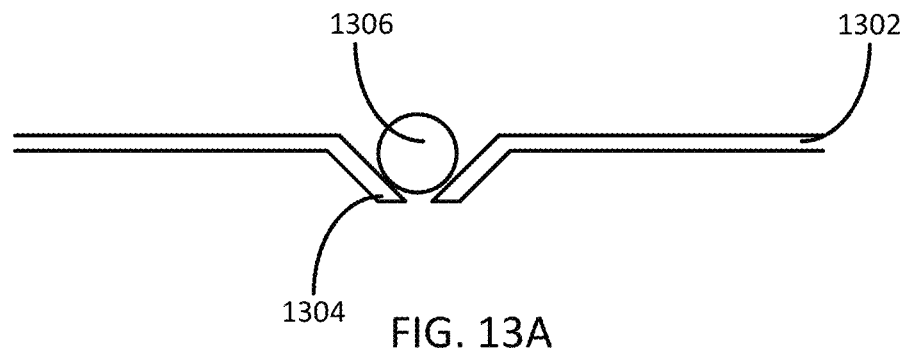
FIG. 13A is a cross-section view of a battery can surface illustrating a first embodiment of an electrolyte fill hole design of the can.
Figure 13B:
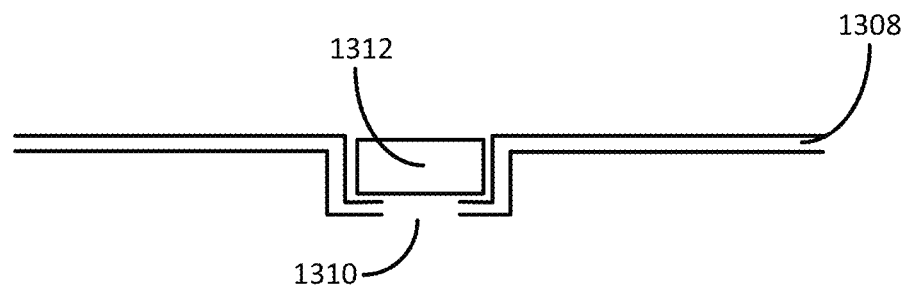
FIG. 13B is a cross-section view of a battery can surface illustrating a second embodiment of an electrolyte fill hole design of the can.

The battery can designs described herein provide for the possibility of thinner walls of the can. In one embodiment, the wall thickness may be reduced from a typical 1 mm thickness down to 50-100 µm. However, such thin walls of the battery can may make it difficult to create and seal an electrolyte fill hole 108 once the electrolyte is introduced into the battery can enclosure. Thus, FIGS. 13A and 13B illustrate a cross-section view of a battery can wall of two embodiments of an electrolyte fill hole design of the can. In general, the electrolyte fill hole may be located in any wall 1302, 1308 of the battery can. The electrolyte fill hole of FIG. 13A includes a through-hole boss 1304 located in the wall 1302. The through-hole provides a hole through which the electrolyte for the battery can may be introduced into the battery can enclosure. The boss through-hole 1304 may be created by folding in the boss to create a frustoconical shape in the wall 1302. After filling, a plug 1306 is located in the boss through-hole 1304 and may be smashed, welded, or covered with a compound, such as epoxy, to create a seal over the hole. In some embodiments, the seal is cured to using ultraviolet curing, laser welding, infrared reactive polymer sealing, and the like.

In another embodiment of the electrolyte fill hole illustrated in FIG. 13B, the electrolyte fill hole 1310 includes an indent in the surface of the can wall 1308. To seal the indent 1310, an external plate 1312 or disc may be placed into the indent and wielded or otherwise sealed into place. In one embodiment, the seal plate 1312 may be flush with the outer surface of the can wall 1308. The sealing process of the seal plate 1312 may be similar to the methods described above with relation to FIG. 13A.

Other features of the battery can 100 design are also contemplated. In one embodiment, the battery stack 302 may be glued or otherwise adhered to the large surface 110 of the first portion 102. In general, however, the battery stack 302 may be adhered to any surface of the enclosure of the battery can 100. Adhering the battery stack 302 to the battery can 100 may allow for less shifting of the battery stack internal to the cell under dynamic loads, minimizing damage to the battery stack and increasing the life of the battery cell. The adhesive used to adhere the battery stack 302 to the can 100 may be conductive or non-conductive. In conductive embodiments, the conductive adhesive serves as an electrical path between the anode electrodes of the battery stack 302 and the can body, thereby removing the need for one or more of the internal tabs to the battery stack. In embodiments where the stack comprises bare anodes on the outside surface of the stack, the metal-to-metal bond can be very strong. In various embodiments, such configurations can allow for less shifting of the cell stack or jelly roll internal to the cell under dynamic loads, which can reduces damage and increase the life of the cell. If the adhesive is conductive, the bond can also serve as the electrical path between the anode electrodes and the can body instead of providing a separate connector (e.g. tabs).

In yet another embodiment of the battery can 100 design, the can may be formed from a single piece and include a hinge portion around which the two clam shell portions of the can are folded. Once folded such that the two portion pieces meet, the pieces may be welded to form the can as described above. In this manner, the weld seam length is reduced as one edge of the weld seam includes the hinge portion of the can design. Other features and/or methods for constructing the battery cans described herein are also contemplated in conjunction with or separate from one or more of the battery can features described.

Additionally, although discussed herein as a battery cell design, it should be appreciated that the battery casing or battery can may be any shape and size as desired by the battery designer. For example, the battery can may be formed to fit within a prescribed area within a computing device. This form may include any number of sides, angles, and/or shapes to account for one or more other components within the computing device casing. Such battery can forms may not be possible with previous battery cell designs as the battery stack must be slid into the enclosure of the battery cell. However, because the battery stack in the can design described above is placed into the enclosure along the Z-axis instead of slid into the enclosure along the X-axis or Y-axis, the battery stack may be of a non-uniform shape to match the shape of a custom battery cell. In this manner, any shape and size of the battery cell may be created in response to the environment or device in which the battery is to be located.

Several advantages over conventional prismatic battery can designs can be realized through various designs and features described herein. For example, the battery can design discussed may provide an increased pressure on the battery stack located within the battery can to reduce swelling of the battery stack and prolong the life of the battery cell and improve performance. Such increases in pressure can arise from the ability to reduce a gap between the battery stack and the can body and/or adjust the thickness of the walls of the can body. Other features of the battery can to increase a pressure on the battery stack include one or more support columns within the battery can enclosure, one or more bossing features on the surfaces of the battery can, and/or one or more localized thinning features on the surfaces of the battery can. The features of the battery can design described herein provide several design choices that may strengthen the battery can and improve the overall performance and lifetime of the battery cell.

The battery cans, battery assemblies, and various non-limiting components and embodiments as described herein can be used with various electronic devices. Such electronic devices can be any electronic devices known in the art. For example, the device can be a telephone, such as a mobile phone, and a land-line phone, or any communication device, such as a smart phone, including, for example an iPhone®, and an electronic email sending/receiving device. The battery cans, battery assemblies, and various non-limiting components and embodiments as described herein can be used in conjunction with a display, such as a digital display, a TV monitor, an electronic-book reader, a portable web-browser (e.g., iPad®), watch and a computer monitor. The device can also be an entertainment device, including a portable DVD player, conventional DVD player, Blue-Ray disk player, video game console, music player, such as a portable music player (e.g., iPod®), etc. Devices include control devices, such as those that control the streaming of images, videos, sounds (e.g., Apple TV®), or a remote control for a separate electronic device. The device can be a part of a computer or its accessories, laptop keyboard, laptop track pad, desktop keyboard, mouse, and speaker.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A battery can assembly comprising:
   a first portion formed of metal comprising a first surface;
   a second portion formed of metal comprising a second surface surrounded by a wall extending from the second surface; and
   a battery stack disposed between the first and second portion;
      wherein the walls of the second portion are welded to the first surface of the first portion to form a seam around a perimeter of the battery can assembly to enclose the battery stack; and
      wherein the second surface of the second portion forms a plurality of indentations that extend into an interior of the battery can assembly to increase the structural rigidity of the second surface.

2. The battery can assembly of claim 1 wherein the wall comprises at least one electrical connection and an electrolyte fill hole.

3. The battery can assembly of claim 1 further comprising:
   a weld protective backing disposed at least partially on an inner surface of the battery can assembly housing the battery stack, the weld protective backing configured to prevent at least some heat from entering the battery can assembly during a welding process.

4. The battery can assembly of claim 3 wherein the battery stack comprises a localized electrode reduction feature corresponding to the seam around the perimeter of the battery can assembly to increase a gap between the seam around the perimeter and the battery stack.

5. The battery can assembly of claim 3 wherein the weld protective backing comprises at least one of: a metal material, a ceramic material, or a polymer material.

6. The battery can assembly of claim 1 further comprising:
   at least one support column located within the battery can assembly comprising a first end and a second end, wherein the first end is connected to the first surface and the second end is connected to the second surface.

7. The battery can assembly of claim 6 wherein the at least one support column further comprises a screw extending through the at least one support column.

8. A battery cell comprising:
   a battery enclosure formed of metal comprising a bottom surface, a top surface, and a wall connecting the bottom surface to the top surface, wherein the wall comprises a weld to form a seam around a perimeter of the battery enclosure;
   a battery stack enclosed within the battery enclosure; and
   a plurality of indentations formed on the bottom surface that extend into an interior of the battery enclosure to increase the structural rigidity of the battery enclosure.

9. The battery cell of claim 8 further comprising at least one support column located within the battery enclosure comprising a first end and a second end, wherein the first end is connected to the bottom surface and the second end is connected to the top surface such that the top surface and the bottom surface apply a pressure force to the battery stack.

10. The battery cell of claim 9 wherein the at least one support column further comprises a screw extending through the at least one support column.

11. The battery cell of claim 8 further comprising:
    a weld protective backing disposed at least partially on an inner surface of the battery enclosure, the weld protective backing configured to prevent at least some heat from entering the enclosure during a welding process used to make the weld seam.

12. The battery cell of claim 11 wherein the weld protective backing comprises at least one of: a metal material, a ceramic material, or a polymer material.

13. The battery cell of claim 8 wherein the battery stack comprises a localized electrode reduction feature corresponding to the seam around the perimeter of the battery enclosure to increase a gap between the seam around the perimeter and the battery stack.

14. The battery cell of claim 8 further comprising an additional plurality of indentations formed on the top surface that further increase the structural rigidity of the battery enclosure.

15. The battery can assembly of claim 1 wherein a thickness of the second surface is about 100 μm.

16. The battery can assembly of claim 1 wherein a thickness of the second surface is greater than a thickness of the wall.

17. The battery cell of claim 8 wherein a thickness of the bottom surface is about 100 μm.

18. The battery cell of claim 8 wherein a thickness of the bottom surface is greater than a thickness of the wall.

* * * * *